(12) United States Patent
Monden et al.

(10) Patent No.: US 8,496,903 B2
(45) Date of Patent: Jul. 30, 2013

(54) CATALYST, PRODUCTION PROCESS THEREFOR AND USE THEREOF

(75) Inventors: Ryuji Monden, Chiba (JP); Tadatoshi Kurozumi, Chiba (JP); Toshikazu Shishikura, Chiba (JP)

(73) Assignee: Show A Denko K.K., Tokyo (JP)

( * ) Notice: Subject to any disclaimer, the term of this patent is extended or adjusted under 35 U.S.C. 154(b) by 188 days.

(21) Appl. No.: 12/863,400

(22) PCT Filed: Jan. 16, 2009

(86) PCT No.: PCT/JP2009/050584
§ 371 (c)(1),
(2), (4) Date: Jul. 16, 2010

(87) PCT Pub. No.: WO2009/091047
PCT Pub. Date: Jul. 23, 2009

(65) Prior Publication Data
US 2011/0059386 A1    Mar. 10, 2011

(30) Foreign Application Priority Data

Jan. 18, 2008 (JP) ................................. 2008-009273
Feb. 5, 2008 (JP) ................................. 2008-024951

(51) Int. Cl.
*C01B 21/12* (2006.01)
*B01J 27/22* (2006.01)
*B01J 27/228* (2006.01)
*B01J 27/24* (2006.01)

(52) U.S. Cl.
USPC ............ 423/365; 502/177; 502/179; 502/200

(58) Field of Classification Search
None
See application file for complete search history.

(56) References Cited

U.S. PATENT DOCUMENTS

| 4,699,800 | A | 10/1987 | Dustmann et al. |
| 4,734,339 | A * | 3/1988 | Schachner et al. ............ 428/701 |
| 4,828,664 | A | 5/1989 | Dietrich et al. |
| 7,767,330 | B2 | 8/2010 | Merzougui et al. |

FOREIGN PATENT DOCUMENTS

| JP | 2003-012375 A | 1/2003 |
| JP | 2003-342058 A | 12/2003 |
| JP | 2006-107967 A | 4/2006 |
| JP | 2006-134603 A | 5/2006 |
| JP | 2006-198570 A | 8/2006 |
| JP | 2007-031781 A | 2/2007 |
| JP | 2007-257888 A | 10/2007 |
| JP | 2008-108594 A | 5/2008 |
| WO | 2006/119407 A2 | 11/2006 |
| WO | 2009/031383 A1 | 3/2009 |

OTHER PUBLICATIONS

Canadian Office Action issued in Canadian Application No. 2721913 dated Feb. 20, 2012.
Doi et al., "Zirconium-Based Compounds for Cathode of Polymer Electrolyte Fuel Cell", J Electrochem Society, 2007, 154 (3), pp. B362-B369.
Kim et al., "Preparation and Characterization of Niobium Carbide and Carbonitride", J Solid State Chemistry, 1999, 142, pp. 100-107.
Ohgi, Y. et al., "Catalytic activity of partially-oxidized transition metal carbonitrides for oxygen reduction reaction", Electrochem Soc of Japan, Mar. 29, 2007, p. 94.

* cited by examiner

*Primary Examiner* — Milton I Cano
*Assistant Examiner* — Sarah A Slifka
(74) *Attorney, Agent, or Firm* — Sughrue Mion, PLLC

(57) ABSTRACT

Catalysts of the invention are not corroded in acidic electrolytes or at high potential and have excellent durability and high oxygen reducing ability. The catalysts include a niobium oxycarbonitride represented by a compositional formula $NbC_xN_yO_z$ (wherein x, y and z represent a ratio of the numbers of the atoms, $0.05 \leq x < 0.7$, $0.01 \leq y < 0.7$, $0.4 \leq z < 2.5$, $1.0 < x+y+z < 2.56$, and $4.0 \leq 4x+3y+2z$).

10 Claims, 9 Drawing Sheets

CATALYST, PRODUCTION PROCESS THEREFOR AND USE THEREOF

FIELD OF THE INVENTION

The present invention relates to catalysts, processes for producing the catalysts, and use of the catalysts.

BACKGROUND OF THE INVENTION

Fuel cells are classified into several types according to the electrolytes or electrodes used therein. Typical types are alkaline types, phosphoric acid types, molten carbonate types, solid electrolyte types and polymer electrolyte types. In particular, polymer electrolyte fuel cells that can operate at temperatures ranging from low temperatures (about −40° C.) to about 120° C. attract attention and are progressively developed and practically used as power sources for low pollution automobiles. The polymer electrolyte fuel cells are expected to be used as automobile drive sources or stationary power sources. The use in these applications requires long-term durability.

The polymer electrolyte fuel cell has a solid polymer electrolyte sandwiched between an anode and a cathode. A fuel is fed to the anode, and oxygen or air is supplied to the cathode, whereby oxygen is reduced at the cathode to produce electricity. The fuel is usually hydrogen or methanol.

To increase the reaction rate in fuel cells and enhance the energy conversion efficiency, a layer containing a catalyst (hereinafter, also the fuel cell catalyst layer) is conventionally provided on the surface of a cathode (an air electrode) or an anode (a fuel electrode) of fuel cells.

Here, noble metals are generally used as the catalysts. Of the noble metals, platinum that is stable at high potential and has high catalytic activity is most frequently used. However, since platinum is expensive and exists in a limited amount, alternative catalysts have been desired.

Further, the noble metals used on a cathode surface are often dissolved in an acidic atmosphere and are not suited in applications requiring long-term durability. Accordingly, it has been strongly demanded that catalysts are developed which are not corroded in an acidic atmosphere and have excellent durability and high oxygen reducing ability.

Materials containing nonmetals such as carbon, nitrogen and boron capture attention as alternative catalysts to platinum. The materials containing these nonmetals are inexpensive compared to noble metals such as platinum and are abundant.

Nonpatent Document 1 reports that zirconium-based ZrOxN compounds show oxygen reducing ability. Patent Document 1 discloses, as platinum-alternative materials, oxygen-reducing electrode materials containing a nitride of one or more elements selected from Groups 4, 5 and 14 in the long periodic table. Patent Document 2 discloses that a partial oxide of a compound of any of titanium, lanthanum, tantalum, niobium and zirconium and any of nitrogen, boron, carbon and sulfur is used as a fuel cell electrode catalyst. Patent Document 3 discloses that titanium carbonitride powder is used as an oxygen electrode catalyst for polymer electrolyte fuel cells.

However, the materials containing these nonmetals do not provide sufficient oxygen reducing ability for practical use as catalysts and their activity is insufficient for the materials to be practically used in fuel cells.

Patent Document 4 discloses an oxycarbonitride obtained by mixing a carbide, an oxide and a nitride and heat treating the mixture in vacuum or an inert or non-oxidative atmosphere at 500 to 1500° C.

However, the oxycarbonitride disclosed in Patent Document 4 is a thin-film magnetic head ceramic substrate material, and the use of the oxycarbonitride as catalyst is not considered therein.

Meanwhile, platinum is useful not only as a fuel cell catalyst as described above but as a catalyst in exhaust gas treatment or organic synthesis. However, the expensiveness and the limited amount of platinum have created a need of alternative catalysts in these applications too.

Patent Document 1: JP-A-2007-31781
Patent Document 2: JP-A-2006-198570
Patent Document 3: JP-A-2007-257888
Patent Document 4: JP-A-2003-342058
Nonpatent Document 1: Journal of The Electrochemical Society, S. Doi, A. Ishihara, S. Mitsushima, N. Kamiya, and K. Ota, 154 (3) B362-B369 (2007)

DISCLOSURE OF THE INVENTION

Problems to be Solved by the Invention

The present invention is aimed at solving the problems in the background art as described above. It is therefore an object of the invention to provide catalysts that are not corroded in acidic electrolytes or at high potential and have excellent durability and high oxygen reducing ability.

Means for Solving the Problems

The present inventors studied diligently to solve the conventional problems in the art. They have then found that catalysts which are formed of specific niobium oxycarbonitride are not corroded in acidic electrolytes or at high potential and have excellent durability and high oxygen reducing ability.

The inventors have also found that the performance of the catalysts is further improved by controlling the ratio of the numbers of the atoms in the niobium oxycarbonitride forming the catalyst. The present invention has been completed based on the finding.

The present invention is concerned with the following (1) to (10), for example.

(1) A catalyst which comprises a niobium oxycarbonitride represented by a compositional formula $NbC_xN_yO_z$ (wherein x, y and z represent a ratio of the numbers of the atoms, $0.05 \leq x < 0.7$, $0.01 \leq y < 0.7$, $0.4 \leq z < 2.5$, $1.0 < x+y+z < 2.56$, and $4.0 \leq 4x+3y+2z$).

(2) A process for producing a catalyst comprising a niobium oxycarbonitride, the process comprising a step of heat treating a niobium carbonitride in an oxygen-containing inert gas to produce a niobium oxycarbonitride.

(3) The process as described in (2) above, wherein the heat treatment in the step is performed at a temperature in the range of 400 to 1400° C.

(4) The process as described in (2) or (3) above, wherein the oxygen concentration in the step is in the range of 0.1 to 10% by volume.

(5) A catalyst layer for fuel cells, comprising the catalyst described in (1) above.

(6) The catalyst layer for fuel cells as described in (5) above, further comprising electron conductive particles.

(7) An electrode comprising a catalyst layer for fuel cells and a porous support layer, wherein the catalyst layer for fuel cells is the catalyst layer for fuel cells as described in (5) or (6) above.

(8) A membrane electrode assembly comprising a cathode, an anode and an electrolyte membrane interposed between the cathode and the anode, wherein the cathode and/or the anode is the electrode as described in (7) above.

(9) A fuel cell comprising the membrane electrode assembly as described in (8) above.

(10) A polymer electrolyte fuel cell comprising the membrane electrode assembly as described in (8) above.

Advantageous Effects of the Invention

The catalysts according to the invention are stable and are not corroded in acidic electrolytes or at high potential, have high oxygen reducing ability and are inexpensive compared to platinum. The fuel cells having the catalysts are therefore relatively inexpensive and have high performance.

PREFERRED EMBODIMENTS FOR CARRYING OUT THE INVENTION

Catalysts

Figure 1:
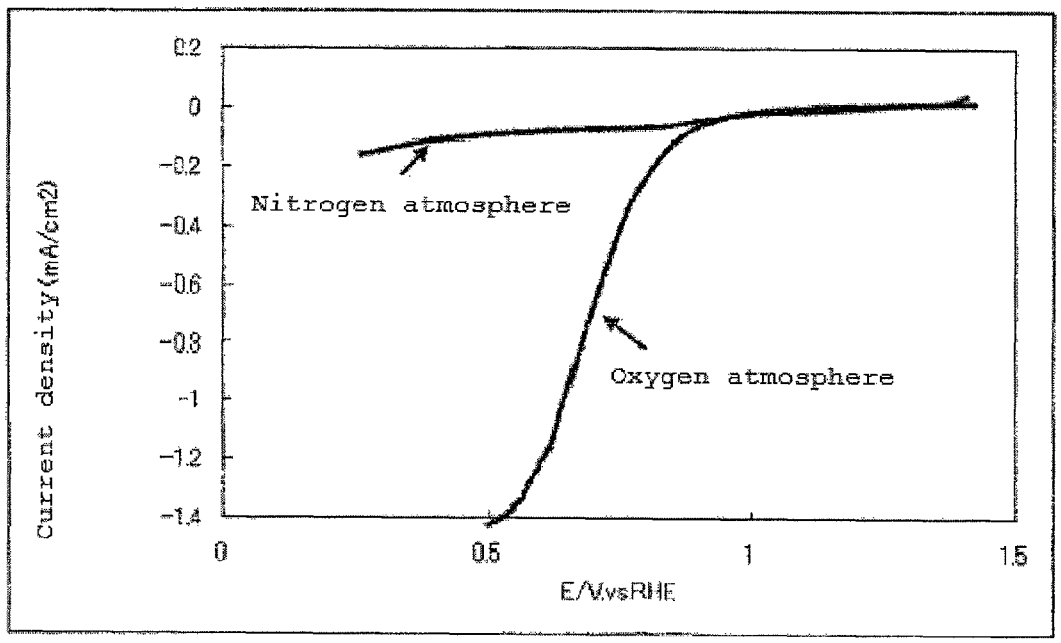
FIG. 1 is a graph showing an evaluation of the oxygen reducing ability of a fuel cell electrode (1) in Example 1.

Catalysts according to the present invention are formed of a niobium oxycarbonitride represented by a compositional formula $NbC_xN_yO_z$ (wherein x, y and z represent a ratio of the numbers of the atoms, $0.05 \leq x < 0.7$, $0.01 \leq y < 0.7$, $0.4 \leq z < 2.5$, $1.0 < x+y+z < 2.56$, and $4.0 \leq 4x+3y+2z$). In the compositional formula, preferably $0.3 \leq x \leq 0.6$, $0.03 \leq y \leq 0.5$, $0.4 \leq z \leq 1.45$, $1.0 < x+y+z \leq 2.0$, and $4.0 \leq 4x+3y+2z \leq 5.0$. This ratio of the numbers of the atoms ensures that the obtainable catalysts show very high oxygen reducing ability.

The letters x, y and z represent the numbers of the C, N and O atoms, respectively, per one Nb atom. x+y+z is an indicator which indicates the crystal system of the compound of Nb, C, N and O. When $NbC_xN_yO_z$ is cubic, the total x+y+z is not more than but is close to 1.0. In the compounds $NbC_xN_yO_z$ used in the invention, the total x+y+z is greater than 1.0. That is, $NbC_xN_yO_z$ used in the invention is assumed to have a distorted cubic or other crystal structure. Such structures of $NbC_xN_yO_z$ are probably due to the following reasons.

Essentially, NbC is a cubic crystal and so is NbN. With carbon being tetravalent and nitrogen trivalent, $NbC_xN_y$ has a distorted cubic crystal structure. When this distorted $NbC_xN_y$ is oxidized, oxygen atoms substitute for vacancies in which part of the carbon or nitrogen atoms in $NbC_xN_y$ are missing, resulting in further distorted $NbC_xN_yO_z$. The compound $NbC_xN_yO_z$ formed by substitution with oxygen atoms has a total x+y+z of greater than 1.0. $NbC_xN_yO_z$ in which x+y+z is greater than 1.0 is probably formed starting from the relative vicinity of the surface of crystal grains. The final $NbC_xN_yO_z$ is considered to have such a crystal structure that part of the oxygen atoms in the $Nb_{12}O_{29}$ crystal are substituted by carbon and nitrogen atoms. The crystal structure is assumed to have a large number of lattice defects and a high density of unpaired electrons, thereby providing high oxygen reducing ability.

For the production of catalysts formed of niobium oxycarbonitride having the above structure and high oxygen reducing ability, it is necessary to control not only the particle diameters and particle shapes of the materials but the production conditions for niobium oxycarbonitride. Detailed production conditions will be described later. For example, the production conditions include appropriate oxidation time, oxidation temperature and oxygen concentration. If such conditions are not met and in particular when the materials are excessively oxidized, the oxidation will give large amounts of Nb oxides such as $Nb_2O_5$ and $Nb_2O_5$-like oxides. If the oxidation proceeds to an excessive degree, the total x+y+z will be 2.56 or more and the obtainable niobium oxycarbonitride will not form catalysts having high oxygen reducing ability.

High oxygen reducing ability is not achieved by simply mixing less distorted $NbC_xN_y$ and $Nb_2O_5$.

In general, carbon is tetravalent, nitrogen is trivalent and oxygen is divalent. Accordingly, when Nb in $NbC_xN_yO_z$ has a valence of 4.0, 4x+3y+2z=4.0. That the total of 4x+3y+2z is 4.0 or more probably indicates that more than usual numbers of carbon, nitrogen and oxygen atoms, in particular oxygen atoms, are bonded. Therefore, $NbC_xN_yO_z$ in which 4x+3y+2z is 4.0 or more is considered to have a high density of unpaired electrons and high oxygen reducing ability.

The catalyst used in the invention preferably has an oxygen reduction onset potential of not less than 0.7 V as measured versus a reversible hydrogen electrode (vs. NHE) by the measurement method (A) described below.

[Measurement Method (A)]

A catalyst and carbon are added to a solvent so that the catalyst dispersed in the carbon being electron conductive particles accounts for 1% by mass. The mixture is ultrasonically stirred to give a suspension. The carbon source herein is carbon black (specific surface area: 100-300 $m^2$/g) (e.g., XC-72 manufactured by Cabot Corporation), and the catalyst is dispersed therein with a catalyst:carbon mass ratio of 95:5. The solvent is a mixture of isopropyl alcohol:water (=2:1 by mass).

While ultrasonicating the suspension, a 30 µl portion thereof is collected and is quickly dropped on a glassy carbon electrode (diameter: 5.2 mm) and dried at 120° C. for 1 hour to form a fuel cell catalyst layer containing the catalyst on the glassy carbon electrode.

Subsequently, 10 µl of Nafion (a 5% Nafion solution (DE521) manufactured by Du Pont Kabushiki Kaisha) diluted ten times with pure water is dropped on the fuel cell catalyst layer and is dried at 120° C. for 1 hour.

Using the electrode manufactured above, polarization is carried out in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode in a sulfuric acid solution of the same concentration is used. In the current-potential curve, the potential at which the reduction current starts to differ by 0.2 µA/cm$^2$ or more between the polarization under the oxygen atmosphere and that under the nitrogen atmosphere is obtained as the oxygen reduction onset potential.

If the oxygen reduction onset potential is less than 0.7 V (vs. NHE), the use of the catalyst in a fuel cell cathode may cause the generation of hydrogen peroxide. For the oxygen reduction, the oxygen reduction onset potential is preferably 0.85 V (vs. NHE) or above. A higher oxygen reduction onset potential is more preferable. The upper limit of the oxygen reduction onset potential is not particularly limited but is theoretically 1.23 V (vs. NHE).

The catalyst layer for fuel cells according to the invention that is prepared using the inventive catalyst is preferably used at a potential of not less than 0.4 V (vs. NHE) in an acidic electrolyte. The upper limit of the potential depends on the stability of the electrode. The electrode according to the invention may be used at as high a potential as about 1.60 V (vs. NHE) which is the oxygen generation potential.

At a potential of less than 0.4 V (vs. NHE), the niobium oxycarbonitride can exist stably but oxygen cannot be reduced sufficiently. Catalysts having such a low potential are not useful in catalyst layers used in membrane electrode assemblies for fuel cells.

The current flow in the use of the catalyst according to the invention may be evaluated based on the oxygen reduction current density (mA/cm$^2$) as measured at a potential of 0.7 V in the method (A). The oxygen reduction current density is preferably not less than 0.1 (mA/cm$^2$), and more preferably not less than 0.5 (mA/cm$^2$). If the oxygen reduction current density is less than 0.1 (mA/cm$^2$), a sufficient amount of current does not flow and the catalyst is not useful in fuel cell catalyst layers.

⟨Catalyst Production Processes⟩

The catalysts described above may be produced by any processes without limitation. An exemplary production process may include a step of heat treating a niobium carbonitride in an oxygen-containing inert gas to produce a niobium oxycarbonitride.

The niobium carbonitride used in the above step may be obtained by a method (I) comprising heat treating a mixture containing niobium oxide and carbon in a nitrogen atmosphere to give a niobium carbonitride; a method (II) comprising heat treating a mixture containing niobium carbide, niobium oxide and niobium nitride in, for example, a nitrogen atmosphere to give a niobium carbonitride; or a method (III) comprising heat treating a mixture containing niobium carbide and niobium nitride in, for example, a nitrogen atmosphere to give a niobium carbonitride.

Another exemplary method is described in Journal of Solid State Chemistry, 142, 100-107 (1999) (Hak Soo Kim, Guy Bugli, and Gerald Djega-Mariadassou).

[Production Method (I)]

In the production method (I), a mixture containing niobium oxide and carbon is heat treated in a nitrogen atmosphere to give a niobium carbonitride.

The heat treatment to produce the niobium carbonitride is performed at a temperature in the range of 600 to 1800° C., and preferably 1200 to 1600° C. This heat treatment temperature ensures that good crystallinity and homogeneity are obtained. The heat treatment at temperatures lower than 600° C. tends to deteriorate crystallinity and homogeneity. Heat treatment temperatures not lower than 1800° C. tend to result in easy sintering.

Examples of the niobium oxides as materials include NbO, NbO$_2$ and Nb$_2$O$_5$. Even any of the niobium oxides are used, niobium oxycarbonitride catalysts obtained by heat treating the niobium carbonitride, which is prepared from the oxide, in an oxygen-containing inert gas have a high oxygen reduction onset potential and high activity.

Examples of the carbons as materials include carbon, carbon blacks, graphites, black leads, activated carbons, carbon nanotubes, carbon nanofibers, carbon nanohorns and fullerenes. The carbon preferably has smaller particle diameters. Such carbon particles have a larger specific surface area and react easily with the oxides. A suitable carbon material is carbon black (specific surface area: 100-300 m$^2$/g, for example XC-72 manufactured by Cabot Corporation).

Appropriate niobium carbonitride may be produced by stoichiometrically controlling the molar ratio of the niobium oxide and the carbon depending on the valence of niobium such as the valence of two, four or five. For example, in the case of niobium (II) oxide, the molar ratio is preferably such that the carbon is used at 1 to 3 mol per 1 mol of the niobium oxide. In the case of niobium (IV) oxide, the molar ratio is preferably such that the carbon is used at 2 to 4 mol per 1 mol of the niobium oxide. In the case of niobium (V) oxide, the molar ratio is preferably such that the carbon is used at 3 to 9 mol per 1 mol of the niobium oxide. If the molar ratio exceeds the upper limit, a large amount of niobium carbide tends to result. If the molar ratio is below the lower limit, a large amount of niobium nitride tends to be formed. In a preferred embodiment with niobium (II) oxide, the molar ratio is such that the carbon is used at 2 to 3 mol per 1 mol of the niobium oxide. In a preferred embodiment with niobium (IV) oxide, the molar ratio is such that the carbon is used at 3 to 4 mol per 1 mol of the niobium oxide. In a preferred embodiment with niobium (V) oxide, the molar ratio is such that the carbon is used at 4 to 9 mol per 1 mol of the niobium oxide. These molar ratios for niobium carbonitrides facilitate the production of niobium oxycarbonitrides (NbC$_x$N$_y$O$_z$) having a ratio of the numbers of the atoms (x, y, z) and a total x+y+z in the above-described ranges.

[Production Method (II)]

In the production method (II), a mixture containing niobium carbide, niobium oxide and niobium nitride is heat treated in, for example, a nitrogen atmosphere to give a niobium carbonitride.

The heat treatment to produce the niobium carbonitride is performed at a temperature in the range of 600 to 1800° C., and preferably 800 to 1600° C. This heat treatment temperature ensures that good crystallinity and homogeneity are obtained. The heat treatment at temperatures lower than 600° C. tends to deteriorate crystallinity and homogeneity. Heat treatment temperatures not lower than 1800° C. tend to result in easy sintering.

Materials used herein are niobium carbide, niobium nitride and niobium oxide.

Examples of the niobium oxides as materials include NbO, $NbO_2$ and $Nb_2O_5$. Even any of the niobium oxides are used, niobium oxycarbonitride catalysts obtained by heat treating the niobium carbonitride, which is prepared from the oxide, niobium carbide and niobium nitride, in an oxygen-containing inert gas have a high oxygen reduction onset potential and high activity.

Appropriate niobium carbonitride may be produced by controlling the amounts (the molar ratio) of the niobium carbide, the niobium oxide and the niobium nitride. The amounts (the molar ratio) are usually such that the niobium carbide (NbC) and the niobium oxide are used at 0.1 to 500 mol and 0.01 to 50 mol, respectively, based on 1 mol of the niobium nitride (NbN), and preferably such that the niobium carbide (NbC) and the niobium oxide are used at 1 to 300 mol and 0.1 to 30 mol, respectively, based on 1 mol of the niobium nitride (NbN). This molar ratio tends to ensure that the obtainable niobium carbonitride gives niobium oxycarbonitride having a high oxygen reduction onset potential and high activity. In a more preferred embodiment, the amounts (the molar ratio) are such that the niobium carbide and the niobium oxide are used at 10 to 300 mol and 0.1 to 10 mol, respectively, based on 1 mol of the niobium nitride. These molar ratios for niobium carbonitrides facilitate the production of niobium oxycarbonitrides ($NbC_xN_yO_z$) having a ratio of the numbers of the atoms (x, y, z) and a total x+y+z in the above-described ranges.

[Production Method (III)]

In the production method (III), a mixture containing niobium carbide and niobium nitride is heat treated in, for example, a nitrogen atmosphere to give a niobium carbonitride.

The heat treatment to produce the niobium carbonitride is performed at a temperature in the range of 600 to 1800° C., and preferably 800 to 1600° C. This heat treatment temperature ensures that good crystallinity and homogeneity are obtained. The heat treatment at temperatures lower than 600° C. tends to deteriorate crystallinity and homogeneity. Heat treatment temperatures not lower than 1800° C. tend to result in easy sintering.

Materials used herein are niobium carbide and niobium nitride. Appropriate niobium carbonitride may be produced by controlling the amounts (the molar ratio) of the niobium carbide (NbC) and the niobium nitride (NbN). The amounts (the molar ratio) are usually such that the niobium nitride (NbN) is used at 0.01 to 10 mol based on 1 mol of the niobium carbide (NbC), and preferably such that the niobium nitride (NbN) is used at 0.1 to 10 mol based on 1 mol of the niobium carbide (NbC). These molar ratios for niobium carbonitrides facilitate the production of niobium oxycarbonitrides ($NbC_xN_yO_z$) having a ratio of the numbers of the atoms (x, y, z) and a total x+y+z in the above-described ranges. The catalysts formed of the above niobium oxycarbonitrides ($NbC_xN_yO_z$) have a high oxygen reduction onset potential and high activity.

(Step of Producing Niobium Oxycarbonitride)

Described below is the step in which the niobium carbonitride is heat treated in an oxygen-containing inert gas to give a niobium oxycarbonitride.

Examples of the inert gases include helium gas, neon gas, argon gas, krypton gas, xenon gas, radon gas and nitrogen gas. Argon gas, helium gas and nitrogen gas are particularly preferable because of their relatively high availability.

The concentration of oxygen in the inert gas depends on the heat treatment time and the heat treatment temperature, but is preferably in the range of 0.1 to 10% by volume, and particularly preferably 0.5 to 5% by volume. When the oxygen concentration is in this range, a homogeneous oxycarbonitride is formed. If the oxygen concentration is below 0.1% by volume, the oxidation tends to fail. If the concentration is in excess of 10% by volume, the oxidation tends to proceed excessively. The inert gas may contain a reducing gas such as hydrogen in addition to oxygen for oxidation. When the inert gas contains a reducing gas such as hydrogen, the niobium carbonitride may be efficiently oxidized to a niobium oxycarbonitride that has a crystal structure containing a large number of lattice defects and corresponding to the $Nb_{12}O_{29}$ crystal with part of the oxygen atoms being substituted with a carbon atom and a nitrogen atom.

The heat treatment in this step is usually performed at a temperature in the range of 400 to 1400° C., and preferably 600 to 1200° C. This heat treatment temperature ensures that homogeneous oxycarbonitride is formed. If the heat treatment temperature is lower than 400° C., the oxidation tends not to proceed. The heat treatment at a temperature not lower than 1400° C. tends to result in excessive oxidation and grain growth.

The heat treatment methods in this step include a standing method, a stirring method, a dropping method and a powder capturing method.

The dropping method is a method comprising heating an induction furnace to a predetermined heat treatment temperature while flowing an inert gas containing a trace amount of oxygen through the furnace; maintaining a thermal equilibrium at the temperature; and then dropping the niobium carbonitride into a crucible which is a heating zone in the furnace to carry out heat treatment. The dropping methods provide advantages that the aggregation and growth of particles of the niobium carbonitride are minimized.

In the powder capturing method, the niobium carbonitride is caused to suspend as particles in an inert gas atmosphere containing a trace amount of oxygen, and the niobium carbonitride is captured and heat treated in a vertical tubular furnace controlled at a predetermined heat treatment temperature.

In the dropping method, the heat treatment time for the niobium carbonitride is usually from 0.5 to 10 minutes, and preferably from 0.5 to 3 minutes. This heat treatment time tends to ensure that a homogeneous oxycarbonitride is formed. The heat treatment for less than 0.5 minute tends to result in partial formation of the oxycarbonitride. If the heat treatment time exceeds 10 minutes, the oxidation tends to proceed excessively.

In the powder capturing method, the heat treatment time for the niobium carbonitride is from 0.2 second to 1 minute, and preferably from 0.2 to 10 seconds. This heat treatment time tends to ensure that a homogeneous oxycarbonitride is formed. The heat treatment for less than 0.2 second tends to result in partial formation of the oxycarbonitride. If the heat treatment time exceeds 1 minute, the oxidation tends to proceed excessively. When the treatment is performed in a tubular furnace, the heat treatment time for the niobium carbonitride may be from 0.1 to 10 hours, and preferably from 0.5 to 5 hours. This heat treatment time tends to ensure that a homogeneous oxycarbonitride is formed. The heat treatment for less than 0.1 hour tends to result in partial formation of the oxycarbonitride. If the heat treatment time exceeds 10 hours, the oxidation tends to proceed excessively.

In the invention, the niobium oxycarbonitrides obtained by the aforementioned processes may be used directly as catalysts according to the invention. In another embodiment, the niobium oxycarbonitride may be crushed into finer particles.

The methods for crushing the niobium oxycarbonitrides include roll milling, ball milling, medium stirring milling, and crushing with an air flow crusher, a mortar or a crushing tank. To crush the niobium oxycarbonitrides into finer particles, an air flow crusher is preferably used. To facilitate the crushing in small amounts, the use of a mortar is preferable.

(Uses)

The catalysts according to the present invention may be used as catalysts alternative to platinum catalysts.

For example, the catalysts may be used as fuel cell catalysts, exhaust gas treatment catalysts and organic synthesis catalysts.

Catalyst layers for fuel cells according to the invention comprise the above catalyst.

The catalyst layers for fuel cells may be anode catalyst layers or cathode catalyst layers, and the catalysts of the invention may be used in any of these layers. Because the catalysts have excellent durability and high oxygen reducing ability, they are preferably used in cathode catalyst layers.

In a preferred embodiment, the catalyst layer for fuel cells further contains electron conductive particles. When the fuel cell catalyst layer comprising the catalyst further contains electron conductive particles, the reduction current may be increased, probably because the electron conductive particles establish electrical contacts with the catalyst to induce electrochemical reaction.

The electron conductive particles are generally used as a carrier for the catalyst.

Examples of the materials forming the electron conductive particles include carbons, conductive polymers, conductive ceramics, metals and conductive inorganic oxides such as tungsten oxide and iridium oxide. These materials may be used singly or in combination with one another. In particular, carbon particles having a large specific surface area or a mixture of carbon particles having a large specific surface area and other electron conductive particles are preferable. That is, the catalyst layer for fuel cells according to a preferred embodiment comprises the catalyst and carbon particles having a large specific surface area.

Examples of the carbons include carbon blacks, graphites, black leads, activated carbons, carbon nanotubes, carbon nanofibers, carbon nanohorns and fullerenes. If the particle diameter of carbon is excessively small, an electron conductive path is hard to be formed. If the particle diameter is excessively large, the catalyst layer for fuel cells tends to reduce gas diffusion properties or the catalyst usage rate tends to be lowered. The carbon particle diameter is preferably in the range of 10 to 1000 nm, and more preferably 10 to 100 nm.

When the electron conductive particles are formed of carbon, the mass ratio of the catalyst and the carbon (catalyst: electron conductive particles) is preferably in the range of 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

A common polymer electrolyte used in fuel cell catalyst layers may be used without limitation. Specific examples include perfluorocarbon polymers having a sulfonic acid group (such as Nafion (a 5% Nafion solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, Nafion (a 5% Nafion solution (DE521) manufactured by Du Pont Kabushiki Kaisha) is preferable.

The catalyst layers for fuel cells according to the present invention may be used as anode catalyst layers or cathode catalyst layers. The catalyst layers for fuel cells contain the catalyst that has high oxygen reducing ability and is resistant to corrosion in acidic electrolytes at high potential. Accordingly, the catalyst layers of the invention are suited for use in fuel cell cathodes (as cathode catalyst layers). In particular, the catalyst layers are suitably provided in cathodes of membrane electrode assemblies in polymer electrolyte fuel cells.

The catalyst may be dispersed on the electron conductive particles as carriers by methods such as airborne dispersion methods and in-liquid dispersion methods. The in-liquid dispersion methods are preferable because the fuel cell catalyst layer may be prepared using a dispersion of the catalyst and the electron conductive particles in a solvent. Exemplary in-liquid dispersion methods include a method using orifice-choked flow, a method using rotational shear flow and a method using ultrasonic. The solvents used in the in-liquid dispersion methods are not particularly limited as long as the catalysts or the electron conductive particles are not corroded and are dispersed therein. Volatile liquid organic solvents and water are generally used.

When the catalyst is dispersed on the electron conductive particles, the electrolyte described above and a dispersant may be dispersed together.

The catalyst layers for fuel cells may be formed by any methods without limitation. For example, a suspension containing the catalyst, the electron conductive particles and the electrolyte may be applied to an electrolyte membrane or a gas diffusion layer as described later. The application methods include dipping, screen printing, roll coating and spraying. In another embodiment, a suspension containing the catalyst, the electron conductive particles and the electrolyte may be applied or filtered on a substrate to form a fuel cell catalyst layer, and the catalyst layer may be transferred to an electrolyte membrane.

Electrodes according to the present invention comprise the fuel cell catalyst layer and a porous support layer.

The electrodes of the invention may be used as cathodes or anodes. The electrodes have excellent durability and high catalytic performance, and therefore are more effective when used as cathodes.

In fuel cells, a solid electrolyte is interposed between an anode electrode and a cathode electrode (membrane electrode assembly). Gas diffusion layers are usually provided between outer collectors and the electrode catalysts to increase diffusibility of the fuel and oxidation gases and to increase the fuel cell efficiency. Exemplary gas diffusion layers are carbon-based porous materials such as carbon paper and carbon cloth, and stainless steel and anticorrosive-coated aluminum foils for weight reduction.

Membrane electrode assemblies of the invention have a cathode, an anode and an electrolyte membrane between the cathode and the anode. The cathode and/or the anode is the electrode as described hereinabove.

The electrolyte membranes may be general perfluorosulfonic acid electrolyte membranes or hydrocarbon electrolyte membranes. Further, polymer fine-pore membranes impregnated with liquid electrolyte, or porous membranes filled with polymer electrolyte may be used.

Fuel cells according to the present invention have the membrane electrode assembly as described above.

The electrode reaction in fuel cells takes place at a three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). Since the catalysts of the invention may be used as alternatives to platinum, the membrane electrode assemblies of the invention may be used in any types of fuel cells. In particular, the use thereof in polymer electrolyte fuel cells provides greater advantages.

EXAMPLES

The present invention will be described based on examples hereinbelow without limiting the scope of the invention.

In Examples and Comparative Examples, measurements were carried out by the following methods.

[Elemental Analysis]

Carbon: Approximately 0.1 g of a sample was weighed out and analyzed with EMIA-110 manufactured by HORIBA, Ltd.

Nitrogen and oxygen: Approximately 0.1 g of a sample sealed in a Ni cup was analyzed with an ON analyzer.

Niobium: Approximately 0.1 g of a sample was weighed on a platinum dish, and nitric acid-hydrofluoric acid was added thereto. The sample was then thermally decomposed. The thermal decomposition product was collected to a predetermined volume, diluted and analyzed by ICP-MS.

Example 1

1. Preparation of Catalyst

Niobium (IV) oxide ($NbO_2$) weighing 2.60 g (21 mmol) was mixed with 600 mg (50 mmol) of carbon (Vulcan 72 manufactured by Cabot Corporation) and was sufficiently crushed. The resultant powder mixture was heat treated in a tubular furnace under a nitrogen atmosphere at 1600° C. for 1 hour to give 2.55 g of niobium carbonitride.

The niobium carbonitride in an amount of 2.00 g was heated in the tubular furnace at 800° C. for 1 hour while passing an argon gas containing 1% by volume of oxygen gas. As a result, 2.15 g of niobium oxycarbonitride (hereinafter, also the catalyst (1)) was obtained.

The results of elemental analysis of the catalyst (1) are shown in Table 1. In the niobium oxycarbonitride ($NbC_xN_yO_z$), x, y and z were 0.52, 0.43 and 0.78 respectively, x+y+z was 1.73, and 4x+3y+2z was 4.93.

2. Production of Fuel Cell Electrode

The oxygen reducing ability was determined in the following manner. The catalyst (1) in an amount of 0.095 g and carbon (XC-72 manufactured by Cabot Corporation) weighing 0.005 g were added to 10 g of a solution consisting of isopropyl alcohol:pure water=2:1 (mass ratio). The mixture was ultrasonically stirred to give a suspended mixture. The mixture in a volume of 30 µl was applied on a glassy carbon electrode (diameter: 5.2 mm, manufactured by Tokai Carbon Co., Ltd.) and was dried at 120° C. for 1 hour. Subsequently, 10 µl of Nafion (a 5% Nafion solution (DE521) manufactured by Du Pont Kabushiki Kaisha) diluted ten times with pure water was applied thereon and was dried at 120° C. for 1 hour. A fuel cell electrode (1) was thus manufactured.

3. Evaluation of Oxygen Reducing Ability

The fuel cell electrode (1) manufactured above was evaluated for catalytic performance (oxygen reducing ability) as described below.

The fuel cell electrode (1) was subjected to polarization in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode was used in a sulfuric acid solution of the same concentration.

In the current-potential curve obtained, the potential at which the reduction current started to differ by 0.2 µA/cm$^2$ or more between the polarization under the oxygen atmosphere and that under the nitrogen atmosphere was obtained as the oxygen reduction onset potential. The difference between the reduction currents was defined as the oxygen reduction current.

The catalytic performance (oxygen reducing ability) of the fuel cell electrode (1) was evaluated based on the oxygen reduction onset potential and the oxygen reduction current.

In detail, the higher the oxygen reduction onset potential and the higher the oxygen reduction current, the higher the catalytic performance (oxygen reducing ability) of the fuel cell electrode (1).

The current-potential curve recorded during the above measurement is shown in FIG. 1.

The current flowability in the fuel cell electrode (1) was evaluated as follows based on the oxygen reduction current density (mA/cm$^2$) at a potential of 0.7 V in the above measurement.

AA: The oxygen reduction current density was 0.5 (mA/cm$^2$) or above.

BB: The oxygen reduction current density was from 0.1 (mA/cm$^2$) to less than 0.5 (mA/cm$^2$).

CC: The oxygen reduction current density was less than 0.1 (mA/cm$^2$).

Table 2 shows the evaluation results of the oxygen reduction onset potential and the reduction current flowability.

The fuel cell electrode (1) manufactured in Example 1 had an oxygen reduction onset potential of 0.95 V (vs. NHE) and an oxygen reduction current density at 0.7 V of 0.7 (mA/cm$^2$), and was found to have high oxygen reducing ability.

Example 2

1. Preparation of Catalyst

The procedures in Example 1 were repeated, except that the amount of carbon was changed from 600 mg to 480 mg (40 mmol), thereby producing 1.83 g of niobium carbonitride. The niobium carbonitride in an amount of 1.02 g was heated to give 1.09 g of niobium oxycarbonitride (hereinafter, also the catalyst (2)).

The results of elemental analysis of the catalyst (2) are shown in Table 1. In the niobium oxycarbonitride ($NbC_xN_yO_z$), x, y and z were 0.32, 0.44 and 0.78 respectively, x+y+z was 1.54, and 4x+3y+2z was 4.16.

2. Production of Fuel Cell Electrode

A fuel cell electrode (2) was produced in the same manner as in Example 1, except that the catalyst (2) was used.

3. Evaluation of Oxygen Reducing Ability

The fuel cell electrode (2) was evaluated for catalytic performance (oxygen reducing ability) as described in Example 1.

Figure 2:
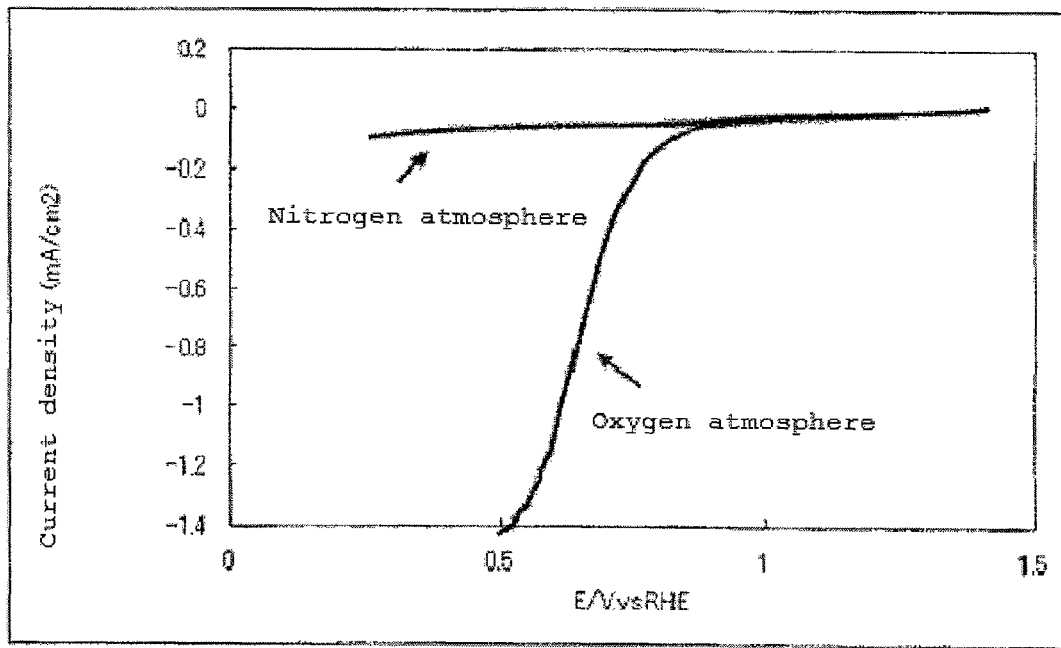
FIG. 2 is a graph showing an evaluation of the oxygen reducing ability of a fuel cell electrode (2) in Example 2.

The current-potential curve recorded during the measurement is shown in FIG. 2.

Table 2 shows the evaluation results of the oxygen reduction onset potential and the reduction current flowability.

The fuel cell electrode (2) manufactured in Example 2 had an oxygen reduction onset potential of 0.77 V (vs. NHE) and an oxygen reduction current density at 0.7 V of 0.5 (mA/cm$^2$), and was found to have high oxygen reducing ability.

Example 3

1. Preparation of Catalyst

The procedures in Example 1 were repeated, except that the amount of carbon was changed from 600 mg to 730 mg (61 mmol), thereby producing 1.67 g of niobium carbonitride. The niobium carbonitride in an amount of 1.10 g was heated to give 1.12 g of niobium oxycarbonitride (hereinafter, also the catalyst (3)).

The results of elemental analysis of the catalyst (3) are shown in Table 1. In the niobium oxycarbonitride ($NbC_xN_yO_z$), x, y and z were 0.55, 0.41 and 0.77 respectively, x+y+z was 1.73, and 4x+3y+2z was 4.97.

2. Production of Fuel Cell Electrode

A fuel cell electrode (3) was produced in the same manner as in Example 1, except that the catalyst (3) was used.

3. Evaluation of Oxygen Reducing Ability

The fuel cell electrode (3) was evaluated for catalytic performance (oxygen reducing ability) as described in Example 1.

Figure 3:
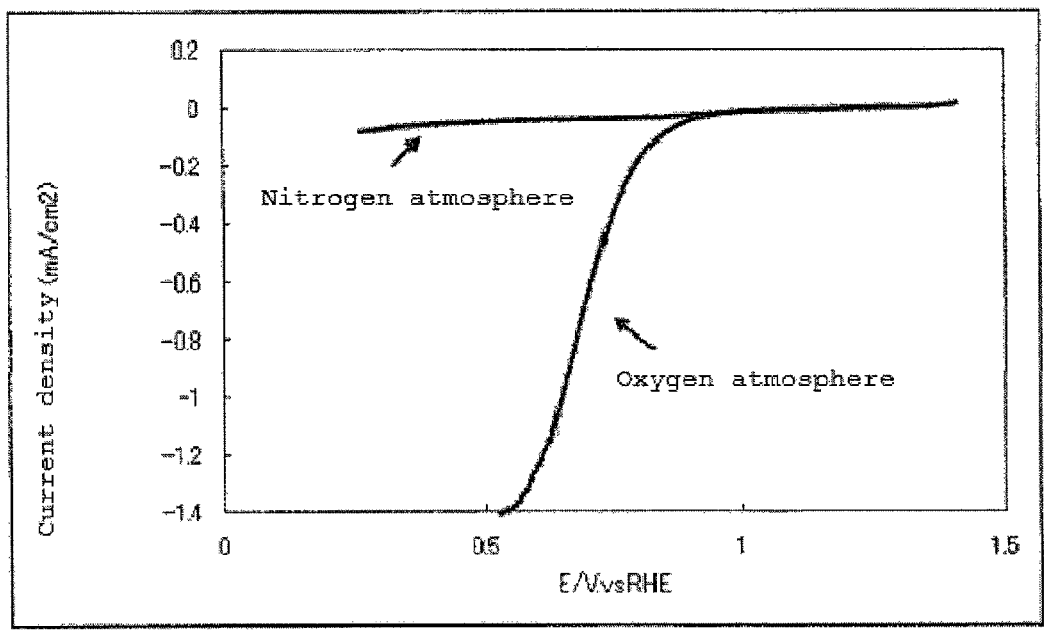
FIG. 3 is a graph showing an evaluation of the oxygen reducing ability of a fuel cell electrode (3) in Example 3.

The current-potential curve recorded during the measurement is shown in FIG. 3.

Table 2 shows the evaluation results of the oxygen reduction onset potential and the reduction current flowability.

The fuel cell electrode (3) manufactured in Example 3 had an oxygen reduction onset potential of 0.94 V (vs. NHE) and an oxygen reduction current density at 0.7 V of 0.55 (mA/cm$^2$), and was found to have high oxygen reducing ability.

Example 4

1. Preparation of Catalyst

The procedures in Example 1 were repeated, except that 2.50 g (20 mmol) of niobium (IV) oxide was replaced by 2.18 g (20 mmol) of niobium (II) oxide and that the amount of carbon was changed from 600 mg to 360 mg (30 mmol), thereby producing 1.95 g of niobium carbonitride. The niobium carbonitride in an amount of 1.01 g was heated to give 1.08 g of niobium oxycarbonitride (hereinafter, also the catalyst (4)).

The results of elemental analysis of the catalyst (4) are shown in Table 1. In the niobium oxycarbonitride ($NbC_xN_yO_z$), x, y and z were 0.39, 0.50 and 0.81 respectively, x+y+z was 1.70, and 4x+3y+2z was 4.68.

2. Production of Fuel Cell Electrode

A fuel cell electrode (4) was produced in the same manner as in Example 1, except that the catalyst (4) was used.

3. Evaluation of Oxygen Reducing Ability

The fuel cell electrode (4) was evaluated for catalytic performance (oxygen reducing ability) as described in Example 1.

Figure 4:
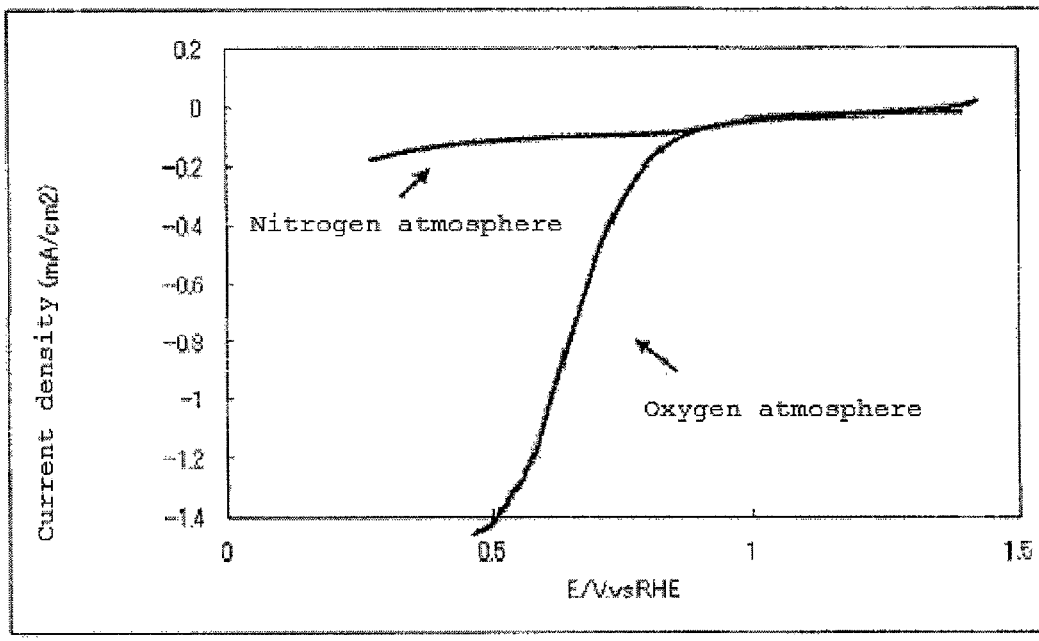
FIG. 4 is a graph showing an evaluation of the oxygen reducing ability of a fuel cell electrode (4) in Example 4.

The current-potential curve recorded during the measurement is shown in FIG. 4.

Table 2 shows the evaluation results of the oxygen reduction onset potential and the reduction current flowability.

The fuel cell electrode (4) manufactured in Example 4 had an oxygen reduction onset potential of 0.88 V (vs. NHE) and an oxygen reduction current density at 0.7 V of 0.5 (mA/cm$^2$), and was found to have high oxygen reducing ability.

Example 5

1. Preparation of Catalyst

Niobium carbide weighing 5.00 g (47 mmol), niobium (IV) oxide weighing 1.25 g (10 mmol) and niobium nitride weighing 0.55 g (5 mmol) were sufficiently mixed together. The resultant mixture was heated in a nitrogen atmosphere at 1600° C. for 3 hours to give 2.75 g of niobium carbonitride. The sintered niobium carbonitride was crushed with a ball mill.

The niobium carbonitride in an amount of 1.10 g was heated in a tubular furnace at 800° C. for 1 hour while passing an argon gas containing 1% by volume of oxygen gas. As a result, 1.17 g of niobium oxycarbonitride (hereinafter, also the catalyst (5)) was obtained.

The results of elemental analysis of the catalyst (5) are shown in Table 1.

In the niobium oxycarbonitride ($NbC_xN_yO_z$), x, y and z were 0.54, 0.51 and 0.65 respectively, x+y+z was 1.70, and 4x+3y+2z was 4.99.

2. Production of Fuel Cell Electrode

A fuel cell electrode (5) was produced in the same manner as in Example 1, except that the catalyst (5) was used.

3. Evaluation of Oxygen Reducing Ability

The fuel cell electrode (5) was evaluated for catalytic performance (oxygen reducing ability) as described in Example 1.

Figure 5:
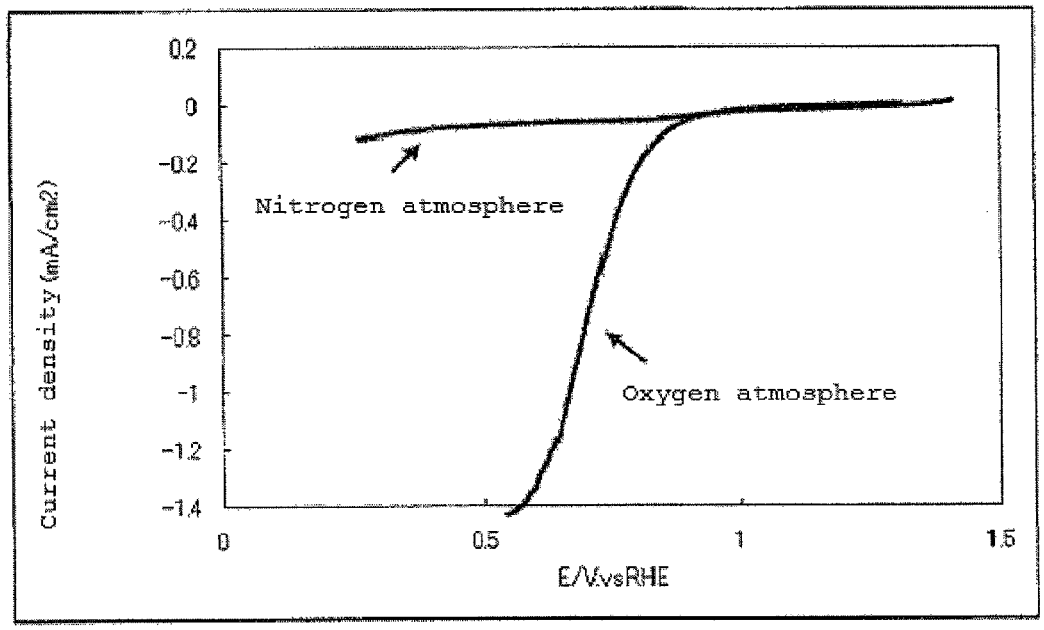
FIG. 5 is a graph showing an evaluation of the oxygen reducing ability of a fuel cell electrode (5) in Example 5.

The current-potential curve recorded during the measurement is shown in FIG. 5.

Table 2 shows the evaluation results of the oxygen reduction onset potential and the reduction current flowability.

The fuel cell electrode (5) manufactured in Example 5 had an oxygen reduction onset potential of 0.93 V (vs. NHE) and an oxygen reduction current density at 0.7 V of 0.8 (mA/cm$^2$), and was found to have high oxygen reducing ability.

Example 6

1. Preparation of Catalyst

Niobium carbide weighing 5.00 g (47 mmol), niobium (IV) oxide weighing 1.24 g (10 mmol) and niobium nitride weighing 0.55 g (5 mmol) were sufficiently mixed together. The resultant mixture was heated in a nitrogen atmosphere at 1600° C. for 3 hours to give 2.64 g of niobium carbonitride. The sintered niobium carbonitride was crushed with a ball mill.

The niobium carbonitride in an amount of 1.10 g was heated in a tubular furnace at 800° C. for 1 hour while passing an argon gas containing 1% by volume of oxygen gas. As a result, 1.13 g of niobium oxycarbonitride (hereinafter, also the catalyst (6)) was obtained.

The results of elemental analysis of the catalyst (6) are shown in Table 1. In the niobium oxycarbonitride ($NbC_xN_yO_z$), x, y and z were 0.45, 0.45 and 0.89 respectively, x+y+z was 1.79, and 4x+3y+2z was 4.93.

2. Production of Fuel Cell Electrode

A fuel cell electrode (6) was produced in the same manner as in Example 1, except that the catalyst (6) was used.

3. Evaluation of Oxygen Reducing Ability

The fuel cell electrode (6) was evaluated for catalytic performance (oxygen reducing ability) as described in Example 1.

Figure 6:
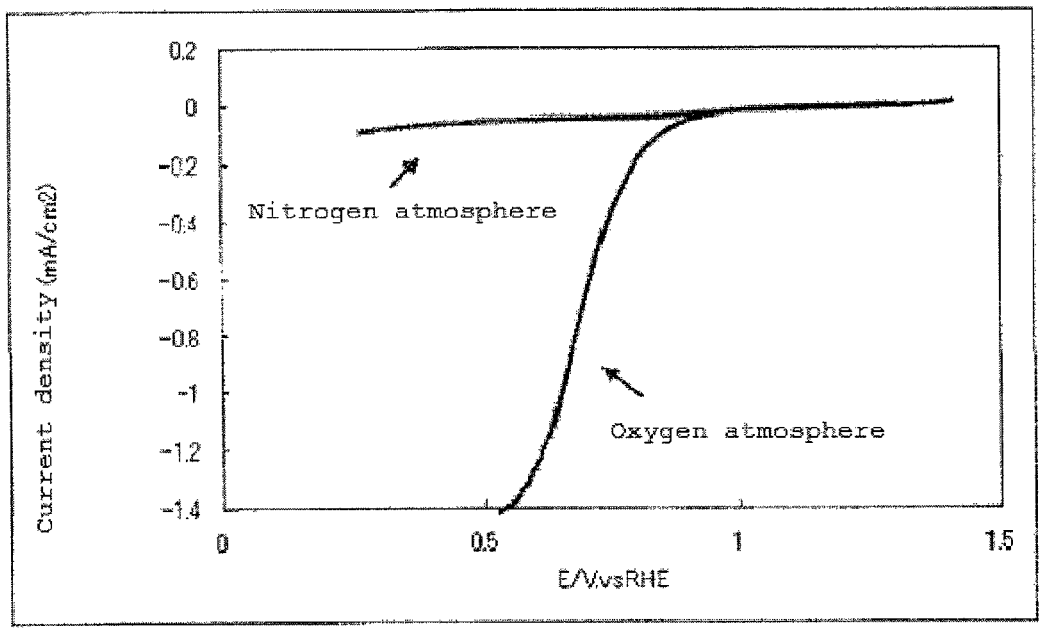
FIG. 6 is a graph showing an evaluation of the oxygen reducing ability of a fuel cell electrode (6) in Example 6.

The current-potential curve recorded during the measurement is shown in FIG. 6.

Table 2 shows the evaluation results of the oxygen reduction onset potential and the reduction current flowability.

The fuel cell electrode (6) manufactured in Example 6 had an oxygen reduction onset potential of 0.92 V (vs. NHE) and an oxygen reduction current density at 0.7 V of 0.6 ($mA/cm^2$), and was found to have high oxygen reducing ability. The electrode was also found to pass a very large amount of current.

Example 7

1. Preparation of Catalyst

Niobium carbide weighing 4.50 g (42 mmol), niobium (IV) oxide weighing 1.24 g (20 mmol) and niobium nitride weighing 0.55 g (5 mmol) were sufficiently mixed together. The resultant mixture was heated in a nitrogen atmosphere at 1600° C. for 3 hours to give 2.20 g of niobium carbonitride. The sintered niobium carbonitride was crushed with a ball mill.

The niobium carbonitride in an amount of 1.10 g was heated in a tubular furnace at 800° C. for 1 hour while passing an argon gas containing 1% by volume of oxygen gas. As a result, 1.15 g of niobium oxycarbonitride (hereinafter, also the catalyst (7)) was obtained.

The results of elemental analysis of the catalyst (7) are shown in Table 1. In the niobium oxycarbonitride ($NbC_xN_yO_z$), x, y and z were 0.35, 0.19 and 1.47 respectively, x+y+z was 2.01, and 4x+3y+2z was 4.91.

2. Production of Fuel Cell Electrode

A fuel cell electrode (7) was produced in the same manner as in Example 1, except that the catalyst (7) was used.

3. Evaluation of Oxygen Reducing Ability

The fuel cell electrode (7) was evaluated for catalytic performance (oxygen reducing ability) as described in Example 1.

Figure 7:
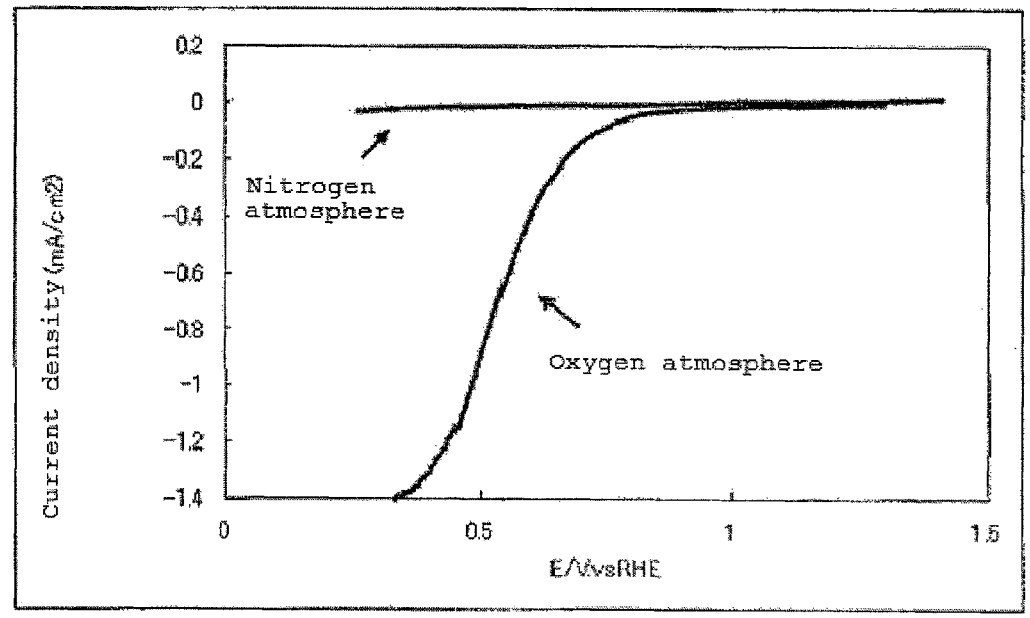
FIG. 7 is a graph showing an evaluation of the oxygen reducing ability of a fuel cell electrode (7) in Example 7.

The current-potential curve recorded during the measurement is shown in FIG. 7.

Table 2 shows the evaluation results of the oxygen reduction onset potential and the reduction current flowability.

The fuel cell electrode (7) manufactured in Example 7 had an oxygen reduction onset potential of 0.98 V (vs. NHE) and an oxygen reduction current density at 0.7 V of 0.25 ($mA/cm^2$), and was found to have high oxygen reducing ability. The electrode was also found to pass a sufficient amount of current.

Example 8

1. Preparation of Catalyst

The procedures in Example 1 were repeated, except that the amount of carbon was changed from 600 mg to 800 mg (67 mmol), thereby producing 1.68 g of niobium carbonitride. 1.13 g of niobium oxycarbonitride (hereinafter, also the catalyst (8)) was prepared from the niobium carbonitride in an amount of 1.10 g.

The results of elemental analysis of the catalyst (8) are shown in Table 1. In the niobium oxycarbonitride ($NbC_xN_yO_z$), x, y and z were 0.51, 0.50 and 0.71 respectively, x+y+z was 1.72, and 4x+3y+2z was 4.96.

2. Production of Fuel Cell Electrode

A fuel cell electrode (8) was produced in the same manner as in Example 1, except that the catalyst (8) was used.

3. Evaluation of Oxygen Reducing Ability

The fuel cell electrode (8) was evaluated for catalytic performance (oxygen reducing ability) as described in Example 1.

Figure 8:
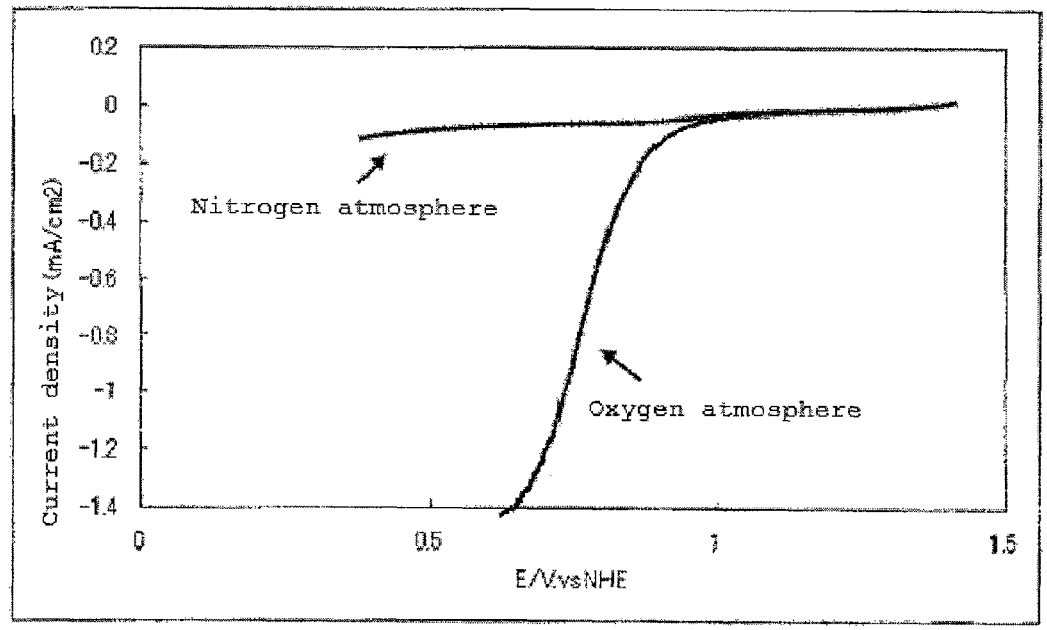
FIG. 8 is a graph showing an evaluation of the oxygen reducing ability of a fuel cell electrode (8) in Example 8.

The current-potential curve recorded during the measurement is shown in FIG. 8.

Table 2 shows the evaluation results of the oxygen reduction onset potential and the reduction current flowability.

The fuel cell electrode (8) manufactured in Example 8 had an oxygen reduction onset potential of 0.92 V (vs. NHE) and an oxygen reduction current density at 0.7 V of 1.10 ($mA/cm^2$), and was found to have high oxygen reducing ability. The electrode was also found to pass a very large amount of current.

Example 9

1. Preparation of Catalyst

Niobium carbide weighing 5.00 g (47 mmol), niobium (IV) oxide weighing 1.24 g (10 mmol) and niobium nitride weighing 0.55 g (5 mmol) were sufficiently mixed together. The resultant mixture was heated in a nitrogen atmosphere at 1600° C. for 3 hours to give 2.64 g of niobium carbonitride. The sintered niobium carbonitride was crushed with a ball mill.

The niobium carbonitride in an amount of 1.10 g was heated in a tubular furnace at 800° C. for 1 hour while passing a nitrogen gas containing 1% by volume of oxygen gas. As a result, 1.14 g of niobium oxycarbonitride (hereinafter, also the catalyst (9)) was obtained.

The results of elemental analysis of the catalyst (9) are shown in Table 1. In the niobium oxycarbonitride ($NbC_x$ $N_yO_z$), x, y and z were 0.40, 0.63 and 0.74 respectively, x+y+z was 1.77, and 4x+3y+2z was 4.97.

2. Production of Fuel Cell Electrode

A fuel cell electrode (9) was produced in the same manner as in Example 1, except that the catalyst (9) was used.

3. Evaluation of Oxygen Reducing Ability

The fuel cell electrode (9) was evaluated for catalytic performance (oxygen reducing ability) as described in Example 1.

Figure 9:
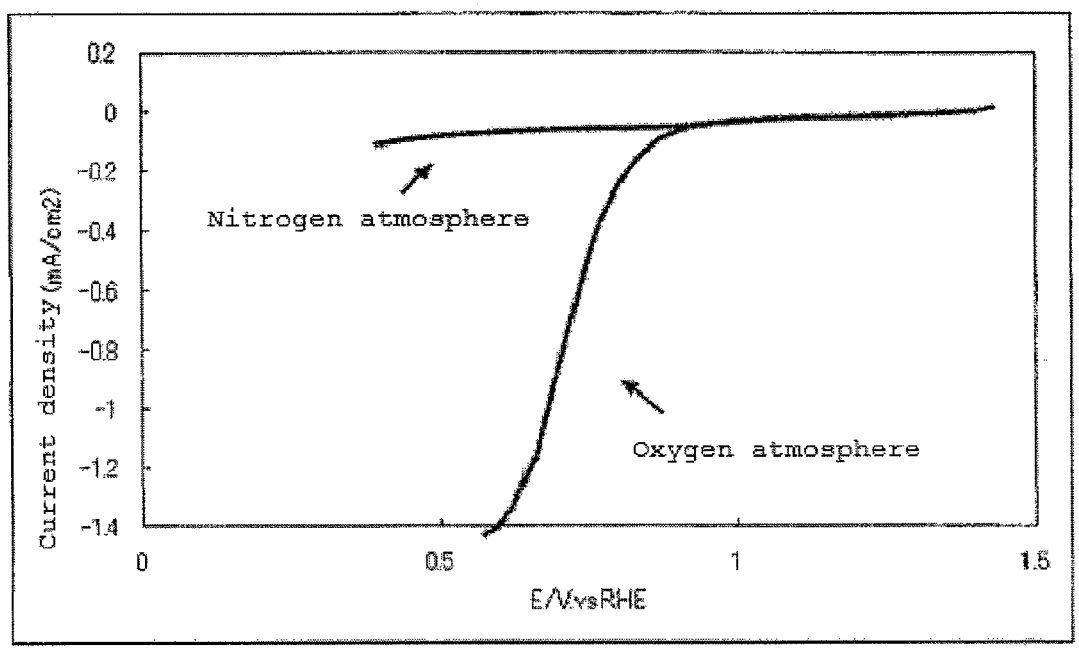
FIG. 9 is a graph showing an evaluation of the oxygen reducing ability of a fuel cell electrode (9) in Example 9.

The current-potential curve recorded during the measurement is shown in FIG. 9.

Table 2 shows the evaluation results of the oxygen reduction onset potential and the reduction current flowability.

The fuel cell electrode (9) manufactured in Example 9 had an oxygen reduction onset potential of 0.89 V (vs. NHE) and an oxygen reduction current density at 0.7V of 0.8 (mA/cm$^2$), and was found to have high oxygen reducing ability. The electrode was also found to pass a very large amount of current.

Example 10

1. Preparation of Catalyst

The procedures in Example 1 were repeated, except that the amount of carbon was changed from 600 mg to 730 mg (61 mmol), thereby producing 1.67 g of niobium carbonitride.

The niobium carbonitride in an amount of 1.00 g was heated in a tubular furnace at 1000° C. for 2 hours while passing an argon gas containing 1.0% by volume of oxygen gas and 2.0% by volume of hydrogen gas. As a result, 0.95 g of niobium oxycarbonitride (hereinafter, also the catalyst (10)) was obtained.

The results of elemental analysis of the catalyst (10) are shown in Table 1. In the niobium oxycarbonitride (NbC$_x$N$_y$O$_z$), x, y and z were 0.22, 0.18 and 1.78 respectively, x+y+z was 2.18, and 4x+3y+2z was 4.98.

2. Production of Fuel Cell Electrode

A fuel cell electrode (10) was produced in the same manner as in Example 1, except that the catalyst (10) was used.

3. Evaluation of Oxygen Reducing Ability

The fuel cell electrode (10) was evaluated for catalytic performance (oxygen reducing ability) as described in Example 1.

Figure 10:
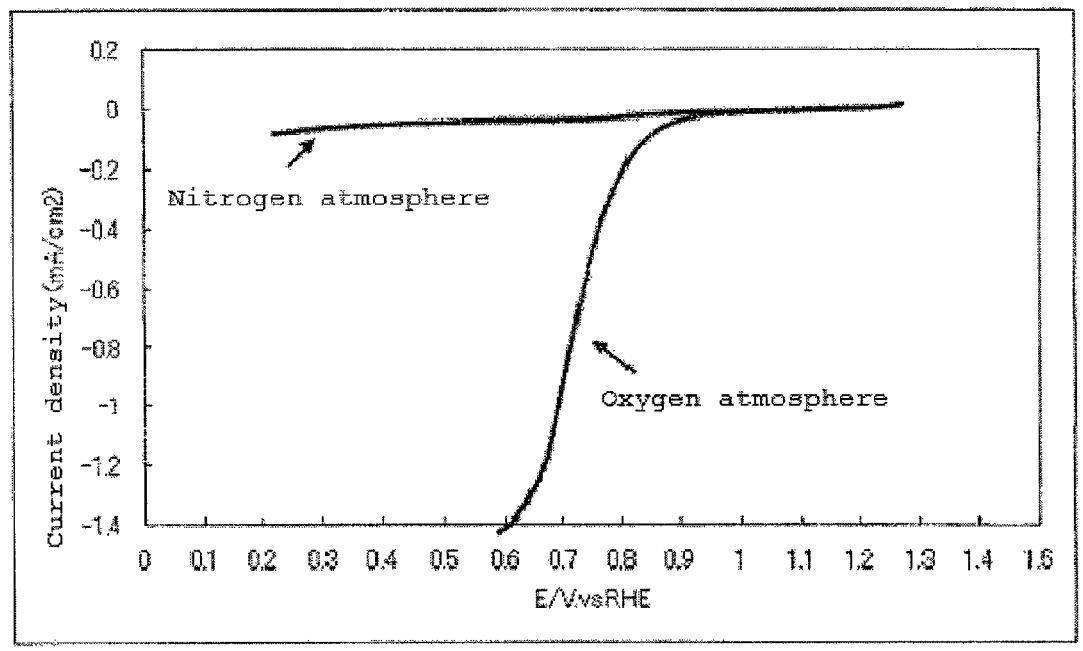
FIG. 10 is a graph showing an evaluation of the oxygen reducing ability of a fuel cell electrode (10) in Example 10.

The current-potential curve recorded during the measurement is shown in FIG. 10.

Table 2 shows the evaluation results of the oxygen reduction onset potential and the reduction current flowability.

The fuel cell electrode (10) manufactured in Example 10 had an oxygen reduction onset potential of 0.98 V (vs. NHE) and an oxygen reduction current density at 0.7 V of 0.82 (mA/cm$^2$), and was found to pass a very large amount of current and have high oxygen reducing ability.

Comparative Example 1

1. Preparation of Catalyst

The procedures in Example 1 were repeated, except that the niobium carbonitride was heated at 390° C., thereby producing 1.99 g of niobium oxycarbonitride (hereinafter, also the catalyst (11)).

The results of elemental analysis of the catalyst (11) are shown in Table 1. In the niobium oxycarbonitride (NbC$_x$N$_y$O$_z$), x, y and z were 0.47, 0.43 and 0.10 respectively, x+y+z was 1.00, and 4x+3y+2z was 3.37.

2. Production of Fuel Cell Electrode

A fuel cell electrode (11) was produced in the same manner as in Example 1, except that the catalyst (11) was used.

3. Evaluation of Oxygen Reducing Ability

The fuel cell electrode (11) was evaluated for catalytic performance (oxygen reducing ability) as described in Example 1.

Figure 11:
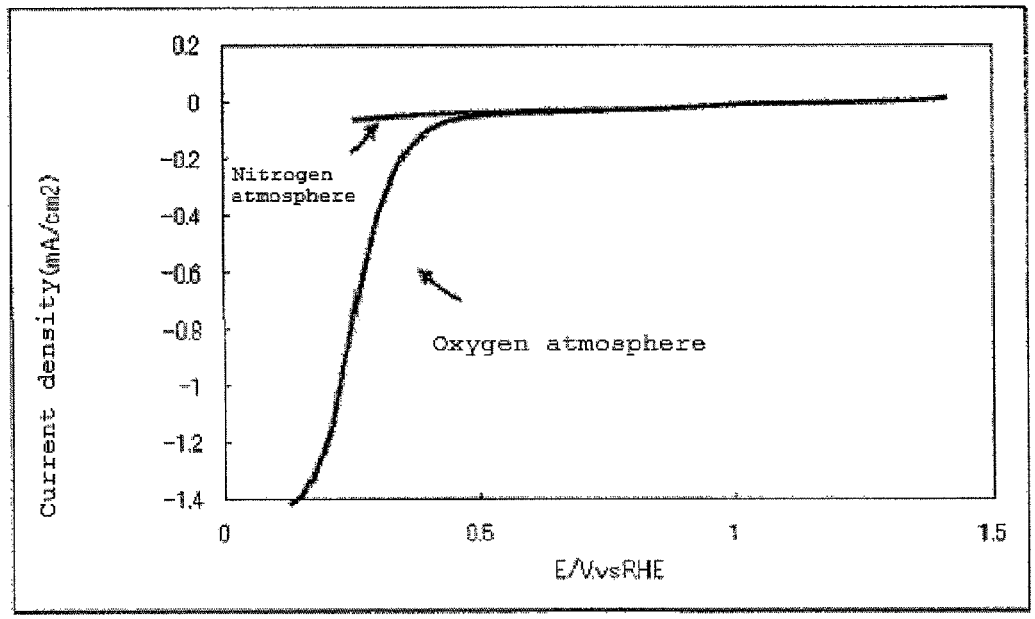
FIG. 11 is a graph showing an evaluation of the oxygen reducing ability of a fuel cell electrode (11) in Comparative Example 1.

The current-potential curve recorded during the measurement is shown in FIG. 11.

Table 2 shows the evaluation results of the oxygen reduction onset potential and the reduction current flowability.

The fuel cell electrode (11) manufactured in Comparative Example 1 had an oxygen reduction onset potential of 0.49 V (vs. NHE) and an oxygen reduction current density at 0.7 V of not more than 0.01 (mA/cm$^2$), and did not show high oxygen reducing ability.

Comparative Example 2

1. Preparation of Catalyst

Niobium carbide weighing 4.96 g (81 mmol), niobium oxide weighing 1.25 g (10 mmol) and niobium nitride weighing 0.54 g (5 mmol) were sufficiently mixed together. The resultant mixture was heat treated in a nitrogen atmosphere at 1500° C. for 3 hours to give 2.70 g of sintered niobium carbonitride (hereinafter, also the catalyst (12)). The sintered niobium carbonitride was crushed with a ball mill.

The results of elemental analysis of the crushed catalyst (12) are shown in Table 1. In the niobium oxycarbonitride (NbC$_x$N$_y$O$_z$), x, y and z were 0.60, 0.49 and 0.00 respectively, x+y+z was 1.09, and 4x+3y+2z was 3.87.

2. Production of Fuel Cell Electrode

A fuel cell electrode (12) was produced in the same manner as in Example 1, except that the crushed catalyst (12) was used.

3. Evaluation of Oxygen Reducing Ability

The fuel cell electrode (12) was evaluated for catalytic performance (oxygen reducing ability) as described in Example 1.

Figure 12:
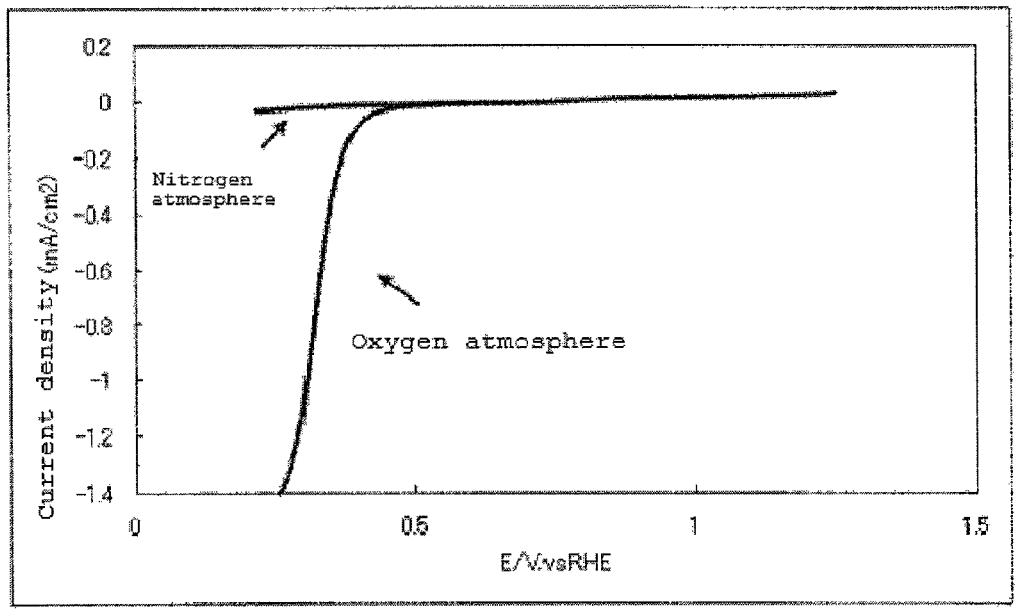
FIG. 12 is a graph showing an evaluation of the oxygen reducing ability of a fuel cell electrode (12) in Comparative Example 2.

The current-potential curve recorded during the measurement is shown in FIG. 12.

Table 2 shows the evaluation results of the oxygen reduction onset potential and the reduction current flowability.

The fuel cell electrode (12) manufactured in Comparative Example 2 had an oxygen reduction onset potential of 0.45 V (vs. NHE) and an oxygen reduction current density at 0.7 V of not more than 0.01 (mA/cm$^2$), and was found to have low oxygen reducing ability.

Comparative Example 3

1. Preparation of Catalyst

Niobium carbide weighing 3.00 g (28 mmol), niobium (IV) oxide weighing 1.25 g (10 mmol) and niobium nitride weighing 0.55 g (5 mmol) were sufficiently mixed together. The resultant mixture was heat treated in a nitrogen atmosphere at 1600° C. for 3 hours to give 2.78 g of niobium carbonitride. The sintered niobium carbonitride was crushed with a ball mill.

The niobium carbonitride in an amount of 1.10 g was heated in a tubular furnace at 900° C. for 1 hour while passing an argon gas containing 1% by volume of oxygen gas. As a result, 1.07 g of niobium oxycarbonitride (hereinafter, also the catalyst (13)) was obtained.

The results of elemental analysis of the catalyst (13) are shown in Table 1. In the niobium oxycarbonitride (NbC$_x$N$_y$O$_z$), x, y and z were 0.24, 0.25 and 0.95 respectively, x+y+z was 1.44, and 4x+3y+2z was 3.61.

2. Production of Fuel Cell Electrode

A fuel cell electrode (13) was produced in the same manner as in Example 1, except that the catalyst (13) was used.

3. Evaluation of Oxygen Reducing Ability

The fuel cell electrode (13) was evaluated for catalytic performance (oxygen reducing ability) as described in Example 1.

Figure 13:
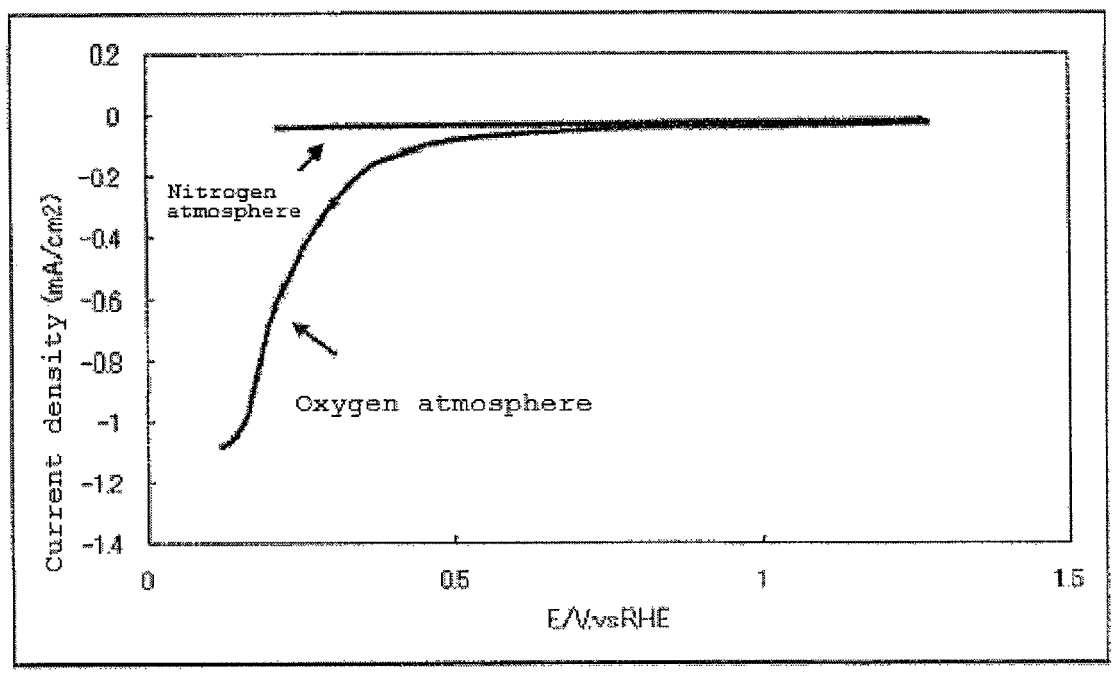
FIG. 13 is a graph showing an evaluation of the oxygen reducing ability of a fuel cell electrode (13) in Comparative Example 3.

The current-potential curve recorded during the measurement is shown in FIG. 13.

Table 2 shows the evaluation results of the oxygen reduction onset potential and the reduction current flowability.

The fuel cell electrode (13) manufactured in Comparative Example 3 had an oxygen reduction onset potential of 0.95 V (vs. NHE). But the oxygen reduction current density at 0.7 V was 0.02 (mA/cm$^2$), and the electrode was found to pass little current.

[Measurement of Water Adsorbed on Catalyst]

The catalyst (6) from Example 6 was used as a sample. The amount of water adsorbed on the catalyst (6) was determined by TG-DTA. The apparatus used in the measurement was TG8120 (manufactured by Rigaku Corporation).

Figure 14:
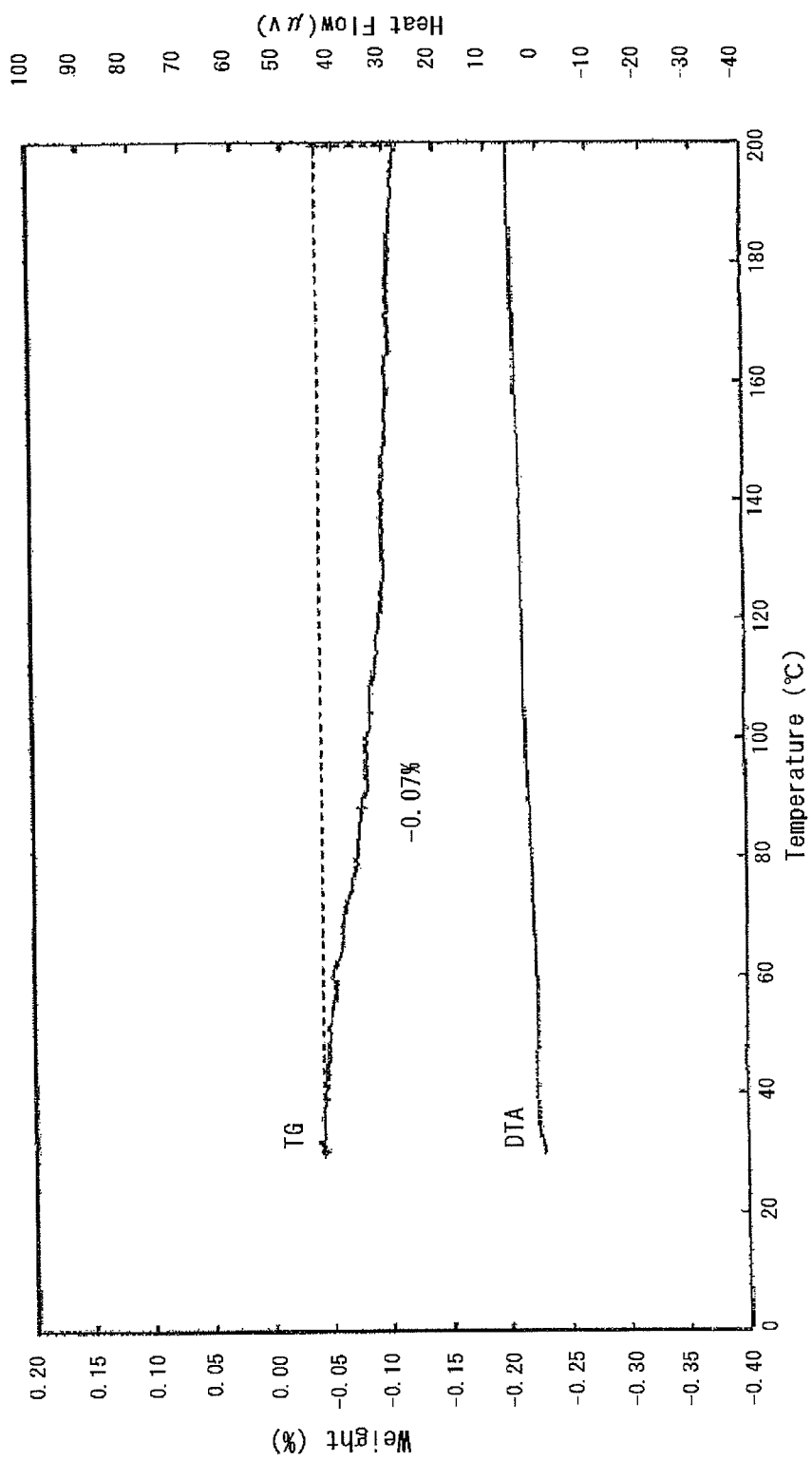
FIG. 14 shows the results of TG-DTA of the catalyst (6) from Example 6, in helium gas.
Figure 15:
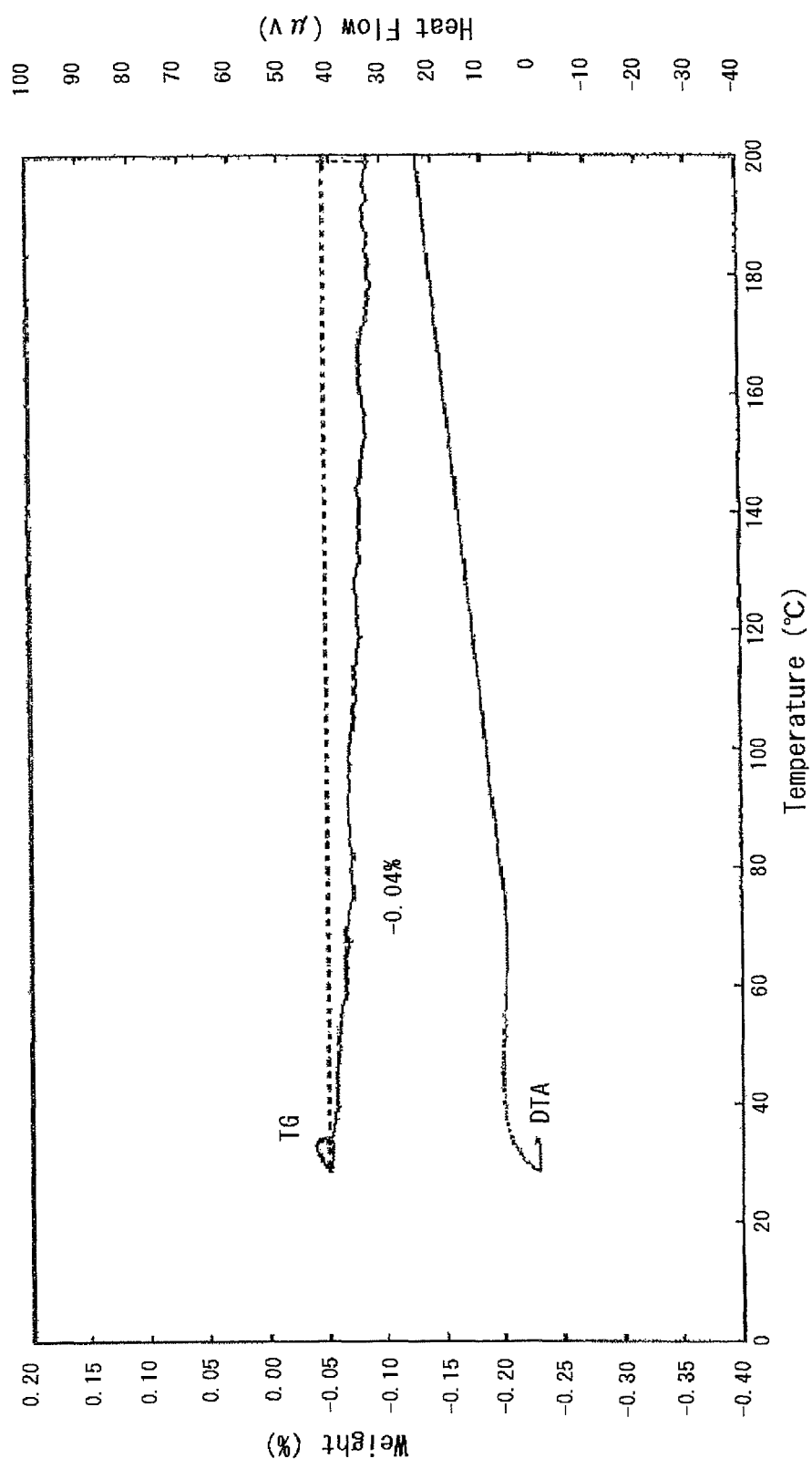
FIG. 15 shows the results of TG-DTA of the catalyst (6) from Example 6, in high-purity nitrogen gas.

In detail, the measurement was performed as follows. The catalyst (6) in an amount of 28.635 mg was collected on a sample container (an aluminum pan (5 mm in diameter and 2.5 mm in depth)). Al$_2$O$_3$ powder was used as a reference. While 6 N helium gas was supplied into the measurement vessel at 200 ml/min, the sample was heated from room temperature to 200° C. at a rate of 2° C./min. The results of the measurement are shown in FIG. 14. The weight reduction ascribed to the water that had been adsorbed on the catalyst (6) was 0.07%. A similar measurement was performed except that the helium gas was changed to high-purity nitrogen gas and the sample amount was changed to 21.315 mg. The results of the measurement are set forth in FIG. 15. The weight reduction ascribed to the water that had been adsorbed on the catalyst (6) was 0.04%. These results showed that the amount of water adsorbed on the catalyst (6) was extremely small and would not alter the ratio of the numbers of the atoms in the niobium oxycarbonitride (NbC$_x$N$_y$O$_z$).

TABLE 1

Results of elemental analysis of the catalysts
(% by weight (The numbers in parenthesis indicate ratios of the numbers of the atoms relative to Nb.))

| | 4x + 3y + 2z | Nb | C | N | O | Composition |
|---|---|---|---|---|---|---|
| Ex. 1 | 4.93 | 79.0 (1) | 5.3 (0.52) | 5.1 (0.43) | 10.6 (0.78) | NbC$_{0.52}$N$_{0.43}$O$_{0.78}$ |
| Ex. 2 | 4.16 | 80.5 (1) | 3.3 (0.32) | 5.3 (0.44) | 10.8 (0.78) | NbC$_{0.32}$N$_{0.44}$O$_{0.78}$ |
| Ex. 3 | 4.97 | 79.0 (1) | 5.6 (0.55) | 4.9 (0.41) | 10.5 (0.77) | NbC$_{0.55}$N$_{0.41}$O$_{0.77}$ |
| Ex. 4 | 4.68 | 79.0 (1) | 4.0 (0.39) | 6.0 (0.50) | 11.0 (0.81) | NbC$_{0.39}$N$_{0.50}$O$_{0.81}$ |
| Ex. 5 | 4.99 | 79.5 (1) | 5.5 (0.54) | 6.1 (0.51) | 8.9 (0.65) | NbC$_{0.54}$N$_{0.51}$O$_{0.65}$ |
| Ex. 6 | 4.93 | 78.2 (1) | 4.5 (0.45) | 5.3 (0.45) | 12.0 (0.89) | NbC$_{0.45}$N$_{0.45}$O$_{0.89}$ |
| Ex. 7 | 4.91 | 75.4 (1) | 2.2 (0.35) | 6.0 (0.19) | 9.7 (1.47) | NbC$_{0.35}$N$_{0.19}$O$_{1.47}$ |
| Ex. 8 | 4.96 | 79.1 (1) | 5.2 (0.51) | 6.0 (0.50) | 9.7 (0.71) | NbC$_{0.51}$N$_{0.50}$O$_{0.71}$ |
| Ex. 9 | 4.97 | 78.5 (1) | 4.1 (0.40) | 7.5 (0.63) | 10.0 (0.74) | NbC$_{0.40}$N$_{0.63}$O$_{0.74}$ |
| Ex. 10 | 4.98 | 73.4 (1) | 2.1 (0.22) | 2.0 (0.18) | 22.5 (1.78) | NbC$_{0.22}$N$_{0.18}$O$_{1.78}$ |
| Comp. Ex. 1 | 3.37 | 87.5 (1) | 5.3 (0.47) | 5.7 (0.43) | 1.5 (0.10) | NbC$_{0.47}$N$_{0.43}$O$_{0.10}$ |
| Comp. Ex. 2 | 3.87 | 86.9 (1) | 6.7 (0.60) | 6.4 (0.49) | 0.0 (0) | NbC$_{0.60}$N$_{0.49}$O$_{0.0}$ |
| Comp. Ex. 3 | 3.61 | 81.1 (1) | 2.5 (0.24) | 3.1 (0.25) | 13.3 (0.95) | NbC$_{0.24}$N$_{0.25}$O$_{0.95}$ |

TABLE 2

Oxygen reduction onset potential and current flowability (oxygen reduction current density (mA/cm$^2$)) of the catalysts

| | Oxygen reduction onset potential (E/V. vs. RHE) | Current flowability (oxygen reduction current density (mA/cm$^2$)) |
|---|---|---|
| Ex. 1 | 0.95 | AA (0.7) |
| Ex. 2 | 0.77 | AA (0.5) |
| Ex. 3 | 0.94 | AA (0.55) |
| Ex. 4 | 0.88 | AA (0.5) |
| Ex. 5 | 0.93 | AA (0.8) |
| Ex. 6 | 0.92 | AA (0.6) |
| Ex. 7 | 0.98 | BB (0.25) |
| Ex. 8 | 0.92 | AA (1.1) |
| Ex. 9 | 0.89 | AA (0.8) |
| Ex. 10 | 0.98 | AA (0.82) |
| Comp. Ex. 1 | 0.49 | CC (not more than 0.01) |
| Comp. Ex. 2 | 0.45 | CC (not more than 0.01) |
| Comp. Ex. 3 | 0.95 | CC (0.02) |

INDUSTRIAL APPLICABILITY

The catalysts of the invention are not corroded in acidic electrolytes or at high potential and have excellent durability and high oxygen reducing ability. The catalysts are therefore suitably used in fuel cell catalyst layers, electrodes, membrane electrode assemblies and fuel cells.

The invention claimed is:

1. A catalyst which comprises a niobium oxycarbonitride represented by a compositional formula NbC$_x$N$_y$O$_z$ wherein x, y and z represent a ratio of the numbers of the atoms, $0.05 \leq x < 0.7$, $0.01 \leq y < 0.7$, $0.4 \leq z < 2.5$, $1.0 < x+y+z < 2.56$, and $4.0 \leq 4x+3y+2z$.

2. A process for producing a catalyst comprising a niobium oxycarbonitride represented by a compositional formula $NbC_xN_yO_z$ wherein x, y and z represent a ratio of the numbers of the atoms, $0.05 \leq x < 0.7$, $0.01 \leq y < 0.7$, $0.4z \leq 2.5$, $1.0 < x+y+z < 2.56$, and $4.0 \leq x+3y+2z$, the process comprising a step of heat treating a niobium carbonitride in an oxygen-containing inert gas to produce the niobium oxycarbonitride.

3. The process according to claim 2, wherein the heat treatment in the step is performed at a temperature in the range of 400 to 1400° C.

4. The process according to claim 2, wherein the oxygen concentration in the step is in the range of 0.1 to 10% by volume.

5. A catalyst layer for fuel cells, comprising the catalyst of claim 1.

6. The catalyst layer for fuel cells according to claim 5, further comprising electron conductive particles.

7. An electrode comprising a catalyst layer for fuel cells and a porous support layer, wherein the catalyst layer for fuel cells is the catalyst layer for fuel cells of claim 5.

8. A membrane electrode assembly comprising a cathode, an anode and an electrolyte membrane interposed between the cathode and the anode, wherein the cathode and/or the anode is the electrode of claim 7.

9. A fuel cell comprising the membrane electrode assembly of claim 8.

10. A polymer electrolyte fuel cell comprising the membrane electrode assembly of claim 8.

\* \* \* \* \*